United States Patent [19]
Quisenberry

[11] Patent Number: 5,081,958
[45] Date of Patent: Jan. 21, 1992

[54] ONE WAY ANIMAL GATE

[76] Inventor: Terry Quisenberry, 895 W. Kuiaha Rd., Haiku, Maui, Hi. 96708

[21] Appl. No.: 548,185

[22] Filed: Jul. 6, 1990

Related U.S. Application Data

[62] Division of Ser. No. 321,695, Mar. 10, 1989, Pat. No. 4,953,323.

[51] Int. Cl.[5] .............................................. A01K 29/00
[52] U.S. Cl. ...................................... 119/155; 119/82; 49/58
[58] Field of Search ....................... 119/155, 82, 16, 15; 256/1; 49/58

[56] References Cited

U.S. PATENT DOCUMENTS

| | | | |
|---|---|---|---|
| 1,235,125 | 7/1917 | Doyle | 119/82 |
| 1,590,878 | 7/1922 | Bohl | 119/155 |
| 4,026,069 | 5/1977 | Bohnett | 119/155 |
| 4,380,969 | 4/1983 | Thomas | 119/82 |

FOREIGN PATENT DOCUMENTS 2026832  2/1980  United Kingdom ................. 119/20

Primary Examiner—John G. Weiss
Attorney, Agent, or Firm—Cushman, Darby & Cushman

[57] ABSTRACT

A one way animal gate and barrier fence are described. The one way animal gate includes a smooth, inclined bottom surface surrounded by two sides extending upwardly from the smooth bottom surface. The gate, is placed in an opening in the barrier fence so an animal proceeding along the fence will encounter the gate, step onto the bottom, and be involuntarily slid to the opposite side of the barrier fence. Once slid, it will be unable to return to the original side of the fence due to an inability to gain traction up the smooth bottom surface.

6 Claims, 2 Drawing Sheets

ONE WAY ANIMAL GATE

This is a division of application Ser. No. 07/321,695 filed Nov. 10, 1989 now U.S. Pat. No. 4,953,323.

FIELD OF THE INVENTION

This invention relates to apparatus for animal management. More particular, this invention relates to a one way animal gate for relocating animals from one area to another.

BACKGROUND OF THE INVENTION

Those involved in the management of animals have long used manual animal gates to corral and contain domestic animals. The manual animal gates have openable portions in a fence line and require human effort and attention to both open the gate to permit the animals to pass through the fence and to prod the animals through the opening. Once the animals have moved through the opening, the openable gate must be manually closed to prevent the animals from returning to the original area. The corralling operation requires considerable human effort.

While the manual animal gate system may be used with domesticated animals such as cattle, horses and pigs, which may be easily trained or encouraged to move through the openable gates, the manual animal gate system is not so effective in corralling or relocating feral animals. Corralling or relocating feral animals is more difficult due to the problems of locating the feral animals in a particular area and enticing the feral animals through the gate in the fence line. Significant human intervention is required during the corralling or relocating operation of feral animals since constant attention must be directed to the gating system to prevent the feral animals from returning to the undesired area once they have passed through the gate. This presents a problem, however, since the presence of a human in the vicinity of the gate to insure that the animals do not return to the original area once they have passed through the gate generally inhibits the enticement of the feral animals through the gate. Thus, a particular dichotomy occurs in that human intervention in the corralling of feral animals is both necessary and defeating.

An animal gating apparatus is thus needed which will relocate animals from one area to another with negligible human intervention.

Doyle, U.S. Pat. No. 1,235,125, discloses, in pertinent part, a cattle loading device in which cattle are prodded or otherwise encouraged up a cleated gangway 35 having an upwardly directed incline. A truck 3 is parked in the vicinity of the inclined end of the gangway 35, with the inclined end higher than the floor 2 of the truck 3. A sheet metal chute 17 is then extended from the inclined edge of the cleated gangway 35 to the floor 2 of the truck 3. As cattle are encouraged up the gangway 35, they reach the inclined edge of the gangway and are motivated to proceed forward until their hooves contact the sheet metal chute 17 where they are involuntarily slid into the truck 3. The chute 17 thus provides a low friction surface to keep cattle moving forward, toward the loading truck, rather than stalling on the gangway 35. The chute 17 also includes short, sheet metal sides 20, presumably to guide the cattle down the center of the chute without slipping over either edge. The Doyle apparatus is designed to encourage a continuous processional of cattle into the loading truck by involuntarily sliding the cattle from the gangway into the truck.

While Doyle thus discloses a low friction one-way passage for animals, Doyle does not disclose that the one-way gate may be used in combination with a barrier fence to coral or relocate domestic or feral animals with minimal human intervention and effort. Further, Doyle does not disclose that the one-way animal gate may have trapezoidal sides to advantageously prevent the animals from jumping over the sides, back through the gate. Accordingly, a one-way gate is needed which entices animals from one side of a barrier fence to another, provides an opening through the barrier fence for the animal to pass, and prevents the animals from returning to the original side.

In addition, a one-way animal chute is needed which discriminates between the types of animals corralled and yet still requires minimal human intervention or effort. When various types of feral or domestic animals are mingled in a particular area, manual segregation of the animal types is tedious and time-consuming. The difficulty associated with segregating the comingled groups is so prohibitive that it generally occurs only in the most essential circumstances. Accordingly, an animal gate is needed which selectively entices and passes animals of a particular type in a co-mingled group through a barrier fence and prevents their return, yet requires minimal human effort or attention.

SUMMARY OF THE INVENTION

In order to overcome the above disadvantages of known relocation and corralling methods which required excessive time and labor, the present invention provides a one-way animal gate in combination with a barrier fence through which animals are enticed to pass and are prevented from returning, with minimal or no human intervention.

The invention provides a one-way animal gate consisting of a smooth bottom surface and trapezoidal sides. The bottom edges of the trapezoidal sides are joined to two edges of the smooth bottom surface to create a U-shaped chute. The sides are shaped so the two edges adjacent the bottom edges are vertical and are laced to two respective barrier fenceposts to create an opening in the barrier fence. The bottom surface of the chute is angled downwardly, preferably at a ratio of two units outward to one unit downward, and may be a hard, smooth surface, a lubricated surface, or a mechanically moving surface.

An animal which encounters the barrier fence will move along the edge of the fence until discovering the chute opening. Through natural instinct, lure or other enticement, the animal will cross the barrier fence through the chute apparatus by stepping on the bottom surface, sliding down the ramp and exiting at the bottom of the chute. Having slid out of the chute, the animal is unable to return to the original side of the fence due to the animal's inability to get traction up the low friction, inclined bottom surface of the chute.

The trapezoidal sides of the chute are advantageously shaped for the objective of corralling animals. The sides provide support for the chute and are tall enough at one end to create a barrier against the animals jumping back through the chute to the original side of the fence, once through. The sides are also low enough at the other end to provide more visibility of the area surrounding the bottom of the chute than similar sides having a rectangular shape. The increased visibility has the affect of further encouraging animals approaching the fence to pass through the opening to the opposite side of the fence.

Further, the sides may be designed to create an interior chute space which only allows animals less than a predetermined size to pass through. This allows the operator to selectively segregate smaller animals from groups of larger animals.

The one way animal gate may be used on, for example, ranches, to corral, relocate or segregate domestic animals or may be used on, for example, wooded lots, to remove undesirable feral animals from the area.

In accordance with these and other objects which will become apparent, the present invention will be described with particular reference to the accompanying drawings.

DETAILED DESCRIPTION OF THE PREFERRED EMBODIMENTS

Figure 1:
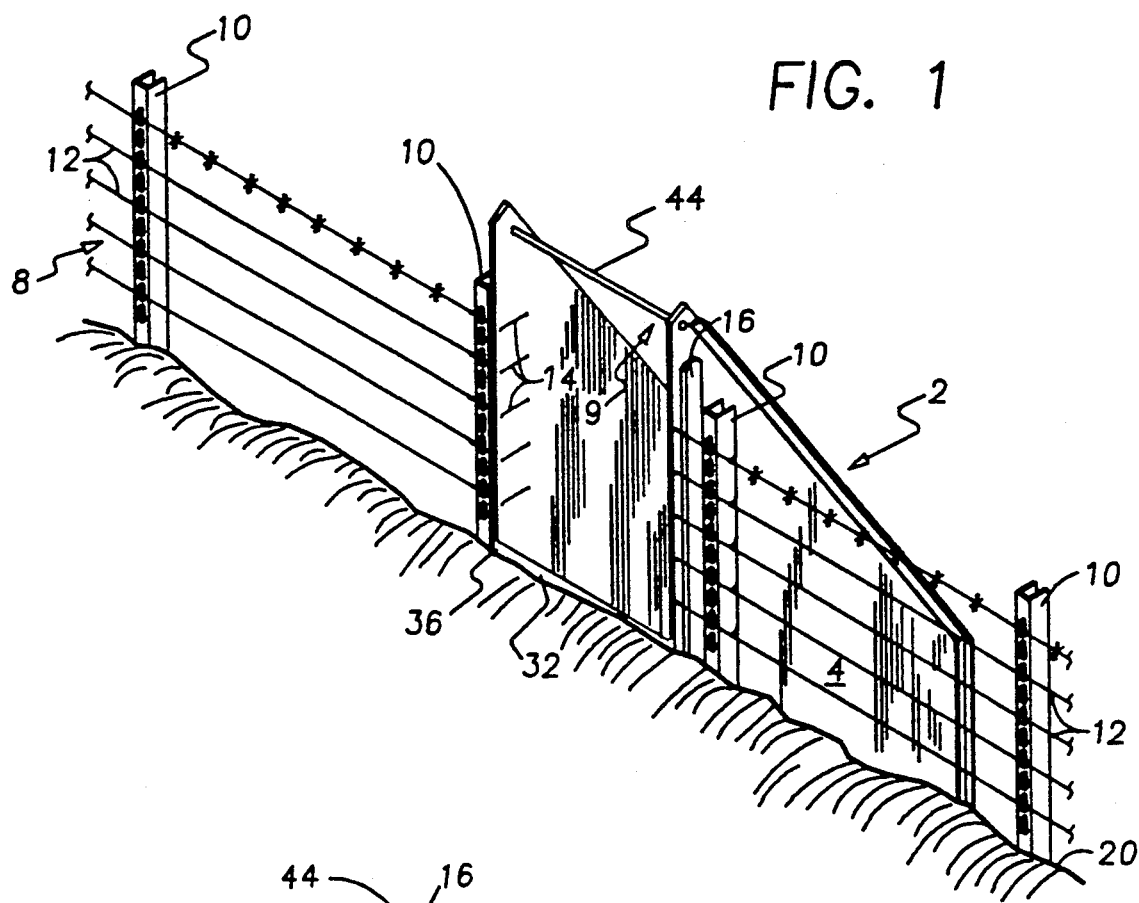
FIG. 1 is a perspective view of the one-way animal gate and barrier fence according to one embodiment of the present invention.
Figure 2:
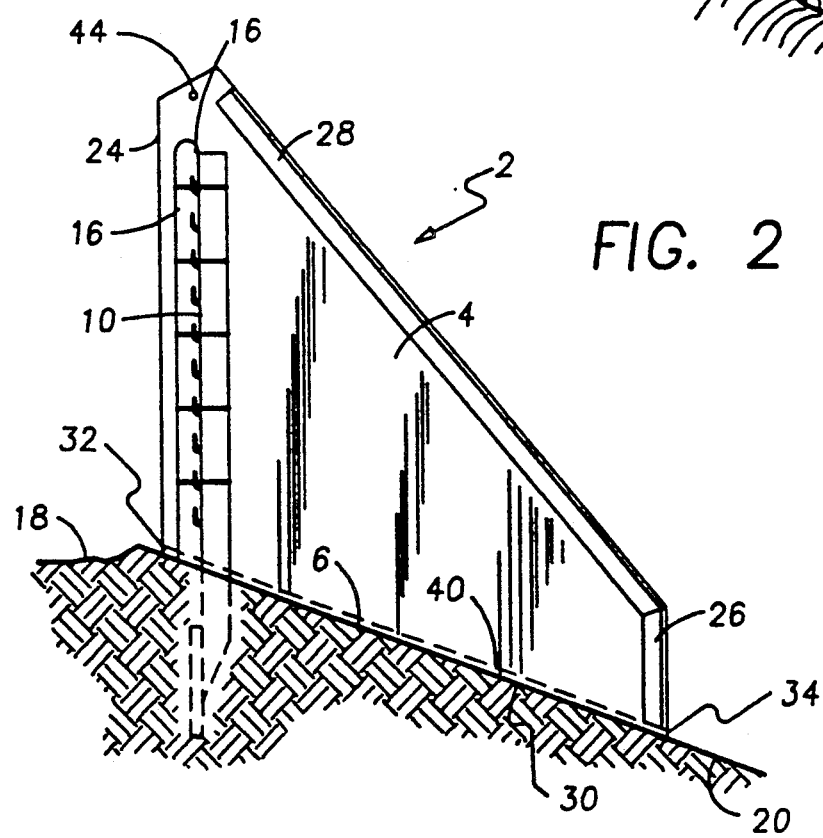
FIG. 2 is a side view of the one-way animal gate and barrier fence of FIG. 1.

FIGS. 1 and 2 illustrate a one-way animal gate 2 according to a preferred embodiment of the present invention. The animal gate includes two sides 4 mounted perpendicularly on a bottom 6 to create a U-shaped channel. The gate 2 is then connected through an opening 9 in the barrier fence defined by two of the plurality of barrier fenceposts 10 supporting the barrier fence 8. The barrier fence 8 includes mesh wire 12 extending between the fenceposts in each direction of the barrier fence from the opening 9.

The wires 12 of the barrier fence 8 connect to each fencepost 10 in the barrier fence line 8 until they reach the barrier fencepost 10 adjacent the opening 9. At this point, the wires 12 lace the barrier fencepost 10 to the side 4 of the gate 2 through a plurality of lacing holes 14 created in the sides of the gate 2. Each of the sides 4 of the gate 2 are thus laced to the barrier fencepost 10 defining the opening 9 in the barrier fence 8.

A single strip of molding 16 is attached to the side 4 to align the gate 2 with the fenceposts 10 on each side of the gate 2. The gate 2 is placed in the opening 9 of the barrier fence 8 with one end resting on an upper ground level 18 and another end resting on a lower ground level 20. The molding 16 may rest against the fencepost 10 on the upper ground level side to prevent the gate 2 from sliding from the upper ground level 18 to the lower ground level 20.

Each side 4 of the gate 2 includes a front edge 24 and a rear edge 26. The front edge 24 and the rear edge 26 may be parallel to each other with the front edge 24 longer than the rear edge 26. Each side 4 also includes a top edge 28 extending from the top of the front edge 24 to the top of the rear edge 26 and a bottom edge 30 extending from the bottom of the front edge 24 to the bottom of the rear edge 26 along the lower ground level 20.

The bottom 6 includes two side bottom ends 36, with one side bottom end connected to the bottom edge 30 of one side 4 and the other side bottom end connected to the bottom edge of the other side. The connection between the side bottom end 36 of the bottom 6 and the bottom edge 30 of the side 4 preferably creates a 90° angle between the plane of the bottom 6 and the planes of the sides 4. The bottom also includes a front bottom end 32 and a rear bottom end 34. The gate 2 is situated between the upper ground level 18 and the lower ground level 20 with the front bottom end 32 resting on the upper ground level 18 near the fenceposts 10 defining the opening 9 in the barrier fence 8 and the rear bottom end 34 supported by the lower ground level 20.

As shown in FIG. 2, the bottom 6 slants downward from the upper ground level 18 along the lower ground level 20 with the plane of the sides 4 extending perpendicular to the plane of the bottom 6. The molding 16 is mounted on the side 4 near the front edge 24 of the side 4. The molding extends from the top edge 28 to the bottom edge 30 to engage with the respective fencepost 10 and to reinforce the side 4 where the fence wires 12 lace through the lacing holes 14 in the side 4.

A stiffening brace 44 may be provided on the gate 2 near the intersection between the front edge 24 and the top edge 28 of each side 4. The stiffening brace 44 provides structure and support for the upper portions of the U-shaped gate 2.

As an animal encounters the barrier fence 8 along some portion of the fence line, the animal will proceed along the barrier fence until it reaches the opening 9 in the barrier fence. Through natural instinct, lure or other enticement, the animal will proceed through the opening 9 and will involuntarily slide from the upper ground level 18 to the lower ground level 20 along the bottom 6 of the gate 2. For this, the bottom 6 should have a smooth, low-friction surface which will slide the animal down the gate 2 with the force of gravity and will prevent the animal from getting traction in the gate 2 during a return attempt. Thus, once the animal is slid from the upper level 18 to the lower level 20 along the smooth bottom 6 of the gate 2 it is unable to return back to the upper ground level 18 through the gate 2 due to its inability to get traction up the bottom surface 6.

FIG. 2 also illustrates that the front edge 24 of the side 4 is longer than the rear edge 26 of the side 4 thus creating a large side surface area near the upper ground level 18 and a small side surface area near the lower ground level 20. The sides of the gate 2 are advantageously shaped for the objective of enticing animals through the opening 9 in the barrier fence 8 and for preventing their return from the lower ground level 20 to the upper ground level 18, once through. The front edge 24 of the gate 2 is high enough to prevent an animal from jumping from the lower ground level 20, over the side 4, and through the opening 9 in the barrier fence 8. Preferably, the front edge 24 of the side 4 extends as high as the fencepost 10 of barrier fence 8. The rear edge 26 of the side 4, however, does not extend as high as the front edge 24 of the side 4 so an animal standing at the upper ground level 18, looking through the opening 9 in the barrier fence 8, will have an expanded view of the lower ground level 20 at the base of the gate 2. By providing increased visibility at the bottom of the gate 2 on the lower ground level 20, the gate 2 is more apt to entice an animal onto the bottom surface 6 of the gate 2 where it is then involuntarily slid to the lower ground level 20.

As the animal slides down the gate 2 along the bottom 6, the gate 2 is held in place by the force of the molding 16 against the fencepost 10 on each side of the gate 2. Thus, the weight of the gate 2 and the weight of the animal sliding along the bottom 6 will not draw the gate 2 down the lower ground level 20 since the molding 16 on each side 4 secures the gate against the respective fenceposts 10 adjacent the opening 9. Further, the wires 12 lacing the fenceposts to the sides 4 through the lacing holes 14 may also encircle the molding 16 to firmly secure the molding 16 to the fencepost 10 to prevent the fenceposts 10 from separating from the sides 4 and allowing the gate 2 to move down the lower ground level 20. The stiffening brace 44 also provides support for the gate 2 near the top edges 28 of the sides 4, further helping to maintain the alignment between the molding 16 and the fenceposts 10.

The bottom 6 of the gate 2 slopes downward from the upper level 18 to the lower level 20 preferably at a rate of one unit downward to two units outward. This angle is generally sufficient to slide hooved animals down the bottom 6 from the upper ground level 18 to the lower ground level 20 and to prevent their return up the bottom 6.

The sides 4 and the bottom 6 may be manufactured of fiberglass and resin in a fiberglass mold in a manner well known to those of ordinary skill in the art. The surface of the fiberglass bottom 6 may then be polished to decrease the coefficient of friction between the bottom surface 6 and the hooves of the animal to ensure that the animal is slid from the upper ground level 18 to the lower ground level 20 and is prevented from returning to the upper ground level along the low-friction bottom surface 6.

Alternatively, the sides 4 and bottom 6 may be manufactured of wood or other suitable material provided the bottom 6 and sides 4 cooperate to move the animals from the upper level 18 to the lower level 20 and prevent their return. To accomplish this, the bottom surface 6 may be a smooth, polished surface, a lubricated surface, or may be a mechanically moving surface.

The fence 8 may be wood, wire or any other suitable fence material and may or may not have fenceposts. For example, the fence may have a brick construction with a concrete foundation, with an opening 9 defined by two brick fence ends. The molding 16 of the gate 2 would then align the sides 4 of the gate 2 with the fence ends of the brick fence. Other fence materials may be appropriately used provided the fence prevents the movement of animals from one side of the fence to the other except as the one-way gate allows.

While the bottom slope is preferably one unit downward for two units outward, the slope may be steeper or more gradual depending on the type of gate bottom used and the type of animal to be corralled. Also, the angle between the plane of the bottom and the plane of the sides may be greater or less than the preferable 90°.

Using the gate 2 as described in FIGS. 1 and 2, animals will effectively relocate themselves from the upper ground level 18 on one side of the barrier fence 8 to the lower ground level 20 on the other side of the barrier fence 8 without any human attention required. Feral or domestic animals which encounter the opening 9 in the barrier fence 8 are enticed to move through the gate 2 from the upper ground level 18 to the lower ground level 20 and are prevented from returning to the upper ground level 18, thus corralling the animals on the lower ground level side 20 of the fence 8 with substantially no human intervention.

Figure 3:
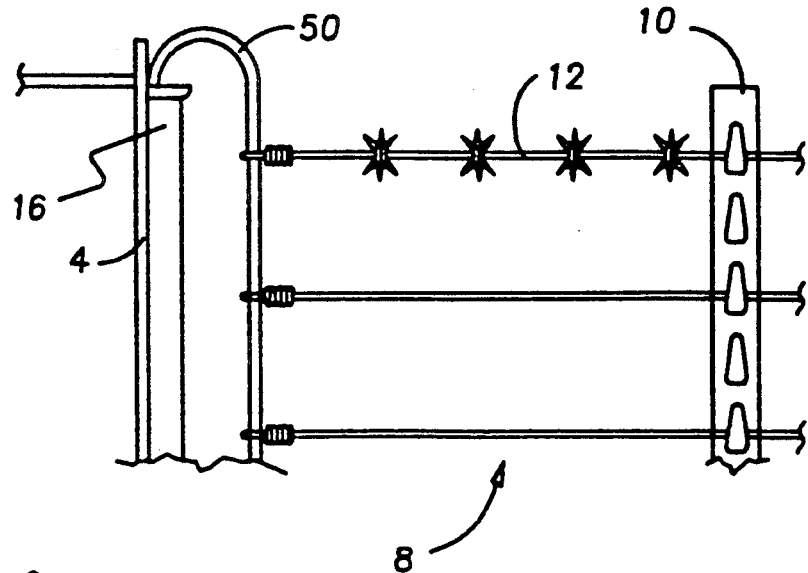
FIG. 3 is an exploded sectional view of the connection between the one-way animal gate and the barrier fence, according to another embodiment of the present invention.

Referring to FIG. 3, another embodiment for connecting the sides 4 to the fence 8 is shown. The molding 16 and the side 4 of the gate 2 may be constructed of wood or other suitable material and fiberglassed into the fiberglass side 4. A support 50 extends from the top of the molding 16 and runs to the ground level close to and parallel with the molding 16. The gap between the support 50 and the molding 16 must be sufficiently narrow so animals on the lower ground level 20 cannot squeeze through to return to the upper ground level 18. The support 50 may be of steel or other construction and provides a rigid support to which the wires 12 of the fence 8 may be secured. In this embodiment, the wires 12 of the barrier fence 8 extend between adjacent fenceposts 10 until they reach the side 4 of the gate 2. At this point, the wires are laced around the support 50 or, alternatively, may be threaded through pre-drilled holes in the support 50. In this manner, the barrier fence 8 would continue up to the support 50, thus preventing animals from crossing the barrier fence 8 except as the one-way gate 2 allows.

Figure 4:
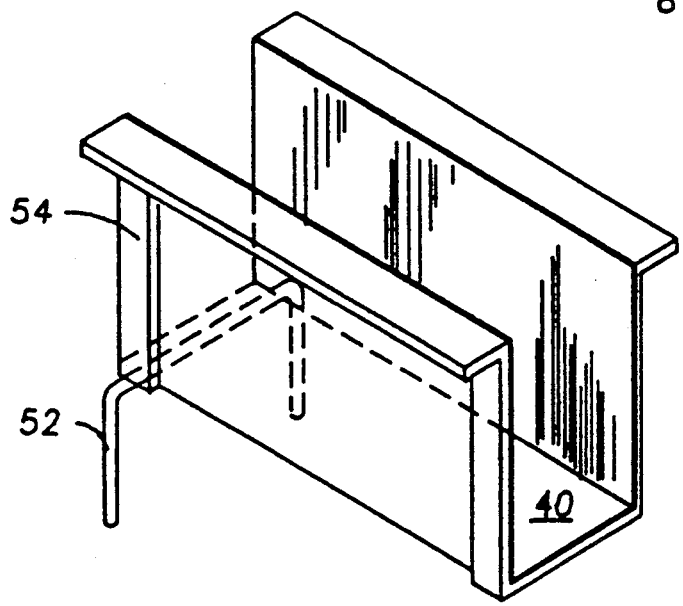
FIG. 4 is a perspective view of the one-way animal gate according to a third embodiment of the present invention.

The fence-gate connection disclosed in FIG. 3, however, lacks the alignment and support provided when the molding 16 can engage with the fencepost 10 as the embodiment of FIG. 2 provides. In FIG. 3, the only structure preventing the gate 2 from sliding from the upper ground level 18 to the lower ground level 20 due to the force of its own weight or the force of its weight in combination with the force of an animal sliding down the bottom 6, is the tension exerted by the barrier fence wires 12 on the support 50. While the barrier fence wires 12 and support 50 may be designed to withstand the gravitational pull on the gate 2 toward the lower ground level 20, FIG. 4 illustrates that anchors 52 may be provided at the front edges 24 of the sides 4 to prevent the gate 2 from moving away from the barrier fence line 8. The gate anchors 52 may be pressed into the ground at the upper ground level 18 to prevent the gate 2 from sliding from the upper ground level 18 to the lower ground level 20. Of course, such anchors can be employed with any embodiment of this invention. The gate 2 may be used on level ground by propping the front bottom end 32 of the bottom 6 higher than the rear bottom end 34 of the bottom 6, using the gate anchors 52. The user would build-up a mound to the level of the front bottom end 32 so animals would proceed up the mound, into the gate 2, and involuntarily slide to the rear bottom end 34 of the bottom 6 of the gate 2, where they would be unable to return up the smooth bottom surface.

FIG. 4 also illustrates that the sides 4 of the gate 2 may be various shapes including rectangular, as shown. The sides 4 may also be strengthened with reinforcing beams 54, which may be wood or other load-bearing materials fiberglassed into the surface of the side 4.

Figure 5:
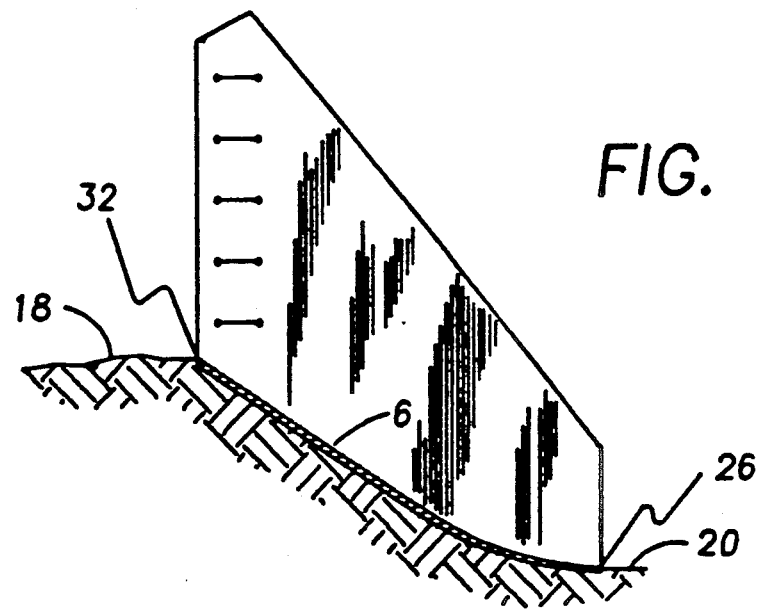
FIG. 5 is a cutaway side view of the one way animal gate according to a fourth embodiment of the present invention.

FIG. 5 illustrates a further embodiment of the present invention. In this embodiment, the bottom 6 slopes downwardly in a straight line from the front bottom end 32 and then curves downwardly near the rear bottom end 34. In this manner, animals which enter the opening 9 in the fence 8 are slid along the bottom 6, first quickly in the straight slope near the front bottom end, then decelerating in the curved slope near the rear bottom end 34. In the embodiment of FIG. 5, animals which are slid down the bottom 6 are not abruptly dropped from the bottom 6 to the lower ground level 20, but are gradually released from the bottom 6 to the lower ground level 20 by the rounded bottom. While the embodiment of FIG. 2 is preferred when the lower ground level 20 is sloped, the embodiment of FIG. 5 is preferred when the lower ground level 20 is substantially horizontal.

The gate dimensions of each of the embodiments of the present invention will vary depending on the terrain, weather, size and type of target animals. Accordingly, the sides 4 of the gate 2 may be expanded or retracted to adjust for the particular size of animal desired. Thus, if an integrated group of different types of animals is located on the upper ground level 18, a particularly small sized one-way gate 2 and barrier fence 8 may be designed to segregate a particularly small sized animal from the larger animals so the smaller animals will be corralled on the lower ground level 20 and the larger animals will remain on the upper ground level 18. The gates may be used for stocking or concentrating animals in a specific area, moving animals from one area to another, clearing an area of animals or trapping animals. The size of the gate 2 and the texture of the bottom 6 may be designed to accommodate the particular size and foot type of, for example, pigs, goats, sheep, cattle, deer, or any other animal, hooved or not.

The gate 2 may be provided in the opening 9 of the barrier fence 8, with the plane of the sides 4 perpendicular to the plane of the fence 8, or may be provided at any appropriate angle for the particular terrain involved.

Further, the fence 8 may be connected to the sides 4 by any known fastening means, rather than the lacing means and support means disclosed in FIGS. 1 and 3, respectively.

While the applicant has described the invention in connection with what the applicant considers the most practical preferred embodiment, the applicant does not limit the invention to the disclosed embodiment, but, on the contrary, intends the invention to cover various modification and equivalent arrangements included in the spirit and scope of the appended claims.

What is claimed is:

1. A method of relocating animals including the steps of:
   providing an opening in a barrier fence;
   sliding animals, which voluntarily enter the opening, from a first side of the barrier fence to a second side of the barrier fence; and
   preventing the animals from returning to the first side of the barrier fence from the second side of the barrier fence.

2. A method according to claim 1, wherein the step of preventing includes the step of providing a surface sloping downward from the opening having a coefficient of friction sufficiently low to prevent the animal from getting traction up the surface.

3. A method of relocating animals including the steps of:
   providing an opening in a barrier fence;
   sliding animals, which sporadically encounter the opening and which enter the opening on their own volition, from a first side of the barrier fence to a second side of the barrier fence; and
   preventing the animals from returning to the first side of the barrier fence from the second side of the barrier fence.

4. A method according to claim 3, wherein the step of preventing includes the step of providing a surface sloping downward from the opening having a coefficient of friction sufficiently low to prevent the animal from getting traction up the surface.

5. A method of relocating animals including the steps of: placing a barrier fence at the crest of a hill; providing an opening in the barrier fence;
   sliding animals, which approach the opening, through the opening and down the hill;
   preventing the animals from returning up the hill.

6. A method according to claim 5, wherein the step of preventing includes the step of providing a sloped surface down the hill having a coefficient of friction sufficiently low to prevent the animal from getting traction up the surface.

* * * * *